United States Patent
Kraft

(12) 
(10) Patent No.: US 6,415,813 B1
(45) Date of Patent: Jul. 9, 2002

(54) SHUT-OFF VALVE FOR A TANK

(75) Inventor: Burkhard Kraft, Isenbüttel (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/694,231

(22) Filed: Oct. 23, 2000

(30) Foreign Application Priority Data

Oct. 22, 1999 (DE) .......................... 199 51 192

(51) Int. Cl.$^7$ .......................... F16K 31/26; F16K 33/00
(52) U.S. Cl. .................. 137/409; 137/434; 137/436; 137/442; 141/198
(58) Field of Search .................. 137/409, 412, 137/413, 415, 434, 442, 443, 444, 446, 436, 429, 430, 416, 420, 432; 141/198

(56) References Cited

U.S. PATENT DOCUMENTS

| | | | |
|---|---|---|---|
| 236,311 A | * 1/1881 | Doherty | 137/444 |
| 2,004,423 A | * 6/1935 | Warren | 137/409 |
| 2,504,638 A | * 4/1950 | Browning | 137/446 |
| 3,625,264 A | * 12/1971 | Swain | 141/198 |
| 3,929,155 A | * 12/1975 | Garretson | 137/430 |
| 4,064,907 A | * 12/1977 | Billington et al. | 137/446 |
| 4,305,422 A | * 12/1981 | Bannink | 137/415 |
| 4,313,459 A | * 2/1982 | Mylander | 141/198 |
| 4,444,230 A | * 4/1984 | Mullem | 141/198 |
| 5,282,496 A | * 2/1994 | Kerger | 141/198 |
| 5,460,197 A | * 10/1995 | Kerger et al. | 141/198 |
| 5,472,012 A | * 12/1995 | Wood et al. | 137/416 |
| 5,487,404 A | * 1/1996 | Kerger | 141/198 |
| 5,660,214 A | * 8/1997 | Pettesch | 141/198 |
| 5,842,500 A | * 12/1998 | Rockwood et al. | 137/413 |
| 5,850,849 A | * 12/1998 | Wood | 137/446 |
| 5,887,609 A | * 3/1999 | Garretson | 137/2 |
| 6,026,841 A | * 2/2000 | Kozik | 137/202 |
| 6,079,438 A | * 6/2000 | Cavagna | 137/315.08 |
| 6,138,709 A | * 10/2000 | Home | 137/413 |

FOREIGN PATENT DOCUMENTS

DE 198 02 078 A1 8/1998

* cited by examiner

Primary Examiner—George L. Walton
(74) Attorney, Agent, or Firm—Cohen, Pontani, Lieberman & Pavane

(57) ABSTRACT

A shut-off valve for a tank, including a filling tube with a filling-side valve seat and a tank-side valve seat. The seats being spaced apart from one another in a throughflow direction of the filling tube. A valve body with a sealing element is movable between the valve seats so as to butt against one of the valve seats depending on position of the valve body in the tube. A component is provided for prestressing the valve body toward the filling-side valve seat so as to seal the filling tube in relation to the filling-side valve seat in a rest position of the valve body, the prestressing component being configured so that the prestressing of the valve body can be overcome by flow pressure of a medium which is to be introduced toward the tank-side valve seat. A filling-level-controlled stop device is operatively arranged for stopping movement of the valve body in the direction of the tank-side valve seat in a position in which the sealing element is kept at a distance from the valve seats so that the medium which is to be introduced can flow around the valve body. The stop action of the stop device is eliminated when a predetermined filling level in the tank is reached.

12 Claims, 3 Drawing Sheets

SHUT-OFF VALVE FOR A TANK

BACKGROUND OF THE INVENTION

1. Field of the Invention

The invention relates to a shut-off valve for a tank.

The valve is suitable particularly for use in conjunction with a fuel tank for a motor vehicle, the shut-off valve being arranged in a filling path leading to the tank. However, it is also possible for the valve to be used for other tank installations, in order to avoid a tank overfilling.

2. Discussion of the Prior Art

In attempts to improve environmental protection, there is great interest in preventing the escape of gaseous phases located in a tank. On the other hand, it is often necessary to avoid a positive pressure being produced in the tank, it being possible for said positive pressure to be produced, for example, by the medium located in the tank being heated or by an external supply of heat. Air-extraction arrangements are provided in order to reduce the positive pressure. Such arrangements, for avoiding the escape of components which are damaging to the health, are equipped with appropriate filters. These air-extracting arrangements usually only allow slow, quasistatic pressure equalization.

Tanks which have their contents used up over time have to be refilled at various time intervals, for which purpose, in particular in the case of motor vehicle tanks, merely temporary connection to a filling line takes place. The tank has to be opened for refilling, in which case gases located in the tank may escape at the filling opening. In the prior art, for example in German reference DE 198 02 078 A1, the filling opening is provided with an automatically closing non-return valve which, when the filling line is removed, for example once a fuel-pump nozzle has been drawn out of a tank-filling opening, immediately closes the tank again. During filling, however, it is possible for gases located in the tank to penetrate outwards. This is countered in some cases by suction-extraction devices which are provided on sides of a filling arrangements and intercept the escaping gases.

During filling, it also has to be ensured that overfilling of the tank is avoided. The usual procedure is that in which, with a sudden rise in the delivery-opposing counterpressure, which takes place, for example, when the mouth opening of the fuel-pump nozzle is submerged in the filling-level surface of a tank or of a tank filler neck, the filling arrangement automatically switches off. In the above-mentioned DE 198 02 078 A1, the tank filler neck is designed to taper in the direction of the actual tank in order, when a maximum filling level is reached, to bring about a temporary build-up in the neck, this causing the filling arrangement to be switched off. The tapering design of the tank filler neck prolongs the time which is necessary for filling the tank. Moreover, the point in time at which the filling arrangement is switched off depends on a large number of influencing parameters, with the result that, in order to avoid overfilling, the tank filler neck is designed for an early switch-off operation. At this point in time, however, the tank is usually not completely filled, with the result that follow-up filling operations are necessary, these having to be carried out manually, in the case of conventional fuel-pump nozzles, and further prolonging the filling time.

SUMMARY OF THE INVENTION

In contrast, the object of the present invention is to provide a shut-off valve for a tank which, in addition to a high level of sealing in the closed state, allows quick, complete filling of the tank.

This object is achieved by a shut-off valve for a tank, comprising a filling tube with a filling-side valve seat and a tank-side valve seat. The seats are spaced apart from one another in the throughflow direction of the filling tube. The valve also has a valve body with a sealing element which can be moved between the valve seats in order, depending on the position of the valve body, to butt against either of the valve seats. The valve body is prestressed in the direction of the filling-side valve seat in order, in a rest position, to seal the filling tube in relation to the filling-side valve seat. It is possible for the prestressing of the valve body to be set such that it can be overcome by the flow pressure of a medium which is to be introduced, in the direction of the tank-side valve seat. A filling-level-controlled stop device is provided for stopping the movement of the valve body in the direction of the tank-side valve seat in a position in which the sealing element is kept at a distance from the valve seats such that the medium which is to be introduced can flow around the same. The stop action of the stop device is eliminated when a predetermined filling level in the tank is reached.

The solution according to the invention combines a high level of sealing with precise discontinuation of a filling operation when a predetermined filling level in the tank is reached, with the result that it is possible to dispense with laborious follow-up refueling operations. The closure of the valve body when the filling level is reached brings about a delivery-opposing, counterpressure which results in the filling arrangement being switched off. Since the closure of the valve body depends directly on the filling level in the tank, this precludes dynamic effects between the tank filler neck and the actual tank. In particular, in this case, it is no longer necessary for the tank filler neck to be designed with a cross section which tapers in the direction of the tank, with the result that the shut-off arrangement according to the invention, in addition, allows a wider tank filler neck and thus quicker filling.

By virtue of the prestressing of the valve body, in the rest position of the shut-off valve, sealing of the tank in relation to the surroundings is ensured on a permanent basis. On the other hand, filling can be carried out without any further measures being required on the valve, since the valve opens as soon as the flow pressure of the filling arrangement is applied. If the maximum filling level is not reached during a filling operation, then it is ensured that, following completion of the filling operation, the valve body immediately returns into the rest position in order to seal the tank in relation to the outside.

The sealing element may be formed integrally with the valve body or may be provided thereon as a separate element.

In an advantageous configuration of the invention, the valve seats are formed on inner-wall portions of the filling tube of which the inner width or diameter is greater than the inner width or internal diameter of a throughflow opening of the filling tube. This means that a large inner width of the filling tube remains for the filling operation. The flow resistance of the filling tube can thus be kept low, with the result that a filling operation can be carried out quickly, and without interruption, in particular also in the case of elevated temperatures.

The valve seats are preferably designed as wall portions which are inclined in relation to the throughflow direction. This makes it possible to achieve self-centering, of the sealing element in relation to the valve seats. Also achieved is good discharge of residual quantities of the filling a medium in the region of the valve seats in the direction of the tank.

In a further, advantageous configuration, the outer width or the external diameter of the sealing element is smaller than the inner width or the internal diameter of a widened tube portion arranged between the valve seats, but greater than the inner width or the internal diameter of the through-flow opening of the filling tube. By virtue of the widened tube portion, the flow resistance of the sealing tube in the region of the valve body is kept low, with the result that, even if relatively large quantities are delivered by the filling arrangement, premature switch off cannot take place. The cross sections of the tube portions in this case need not be round; they may also have other profile shapes.

In order to reduce the mass of the valve body, the valve body is designed as a hollow piston. This allows the valve body to be returned into the rest position even by way of low spring forces. This allows, in turn, filling to take place even at low delivery pressures. The flow resistance of the valve body can be further reduced if, according to a further, preferred configuration, on its end side which is oriented toward the filling-side valve seat, the valve body is designed as a convexity which tapers in the direction of the filling,-side valve seat.

In an embodiment that is particularly straightforward by means of design, and only has a small number of components, the valve body is guided with sliding action on an innerwall portion of the filling tube. The filling medium acts here as a lubricant, this giving particularly smooth-running mounting of the valve body, with the result that the returing forces for sealing the tank can be kept low and/or the valve body can easily be moved by the flow pressure into a switch-off position, in which the sealing element comes into abutment against the tank-side valve seat.

The valve body is preferably supported against the inner wall of the filling tube via a spring, of which the prestressing is set such that the valve body is automatically pressed with sealing action, by way of its sealing element, against the filling-side valve seat. The sealing can be eliminated by the flow pressure of a medium which is to be introduced.

In a further, advantageous configuration of the invention, the region between the valve seats is connected to a portion of the filling tube and/or of the tank downstream of the tankside valve seat via an overflow line which takes effect when the sealing element butts against the tank-side valve seat and has a defined throttle location for slow pressure equalization. It is thus possible, following closure of the valve body against the tank-side valve seat, for medium located in the filling tube downstream of the tank-side valve seat to be discharged slowly into the tank until the valve body is returned into abutment against the filling-side valve seat again.

A spatially compact and also robust design which is not susceptible to malfunctioning is obtained by the stop device being configured with a displaceable stop protrusion which is intended for stopping the movement of the valve body, which is arranged in a tube portion of the filling tube between the tank-side valve seat and the tank, against which a supporting element of the valve body butts in a stopped position, and which is coupled to a filling-level signaling device. In dependence on the filling-level signaling device, when a predetermined filling level in the tank is reached, the stop protrusion is moved out of its stop position in order to release a further displacement path for the supporting element of the valve body. An example of a possible filling-level signaling device is a float which is arranged in the tank and, when a certain filling level is reached, produces a mechanical or electrical signal which is converted into an actuating signal for the stop protrusion. This can take place, for example, via a mechanical linkage which connects the float to the stop device. Instead of the mechanical linkage, it is also possible to use an electrical actuating element for actuating the stop device.

The stop device preferably comprises a flap which can be pivoted about a pin in the direction transverse to the through-flow direction and which has an opening which upon displacement of the stop protrusion, as a result of a predetermined filling level in the tank being reached, can be pivoted into the position of the stop protrusion. The switch-off operation can then be brought about, in a manner which is particularly straightforward in terms of design, when the filling level is reached. During the filling operation, the supporting element of the valve body remains supported on the stop protrusion until such time as the stop protrusion is pivoted out of its supporting position. It is replaced by the opening, through which the supporting element of the valve body penetrates, with the result that the supporting element is moved in the direction of the tank again, whereby the sealing element of the valve body passes into abutment against the tank-side valve seat and causes the filling arrangement to be switched off.

In order to simplify the production, the flap of the stop device is designed as a plate-like element, for example as a sheet-metal element, with a border portion which is bent about the transverse pin as the stop protrusion, against a supporting surface of which the supporting element of the valve body can be brought into lateral abutment. The opening on the plate-like elements adjoins the stop protrusion in order to pass into the position of the supporting surface when the plate-like element is pivoted about the transverse pin, the opening being larger than the supporting surface. The plate-like element may be produced, for example, as a straight-forward bent sheet-metal part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
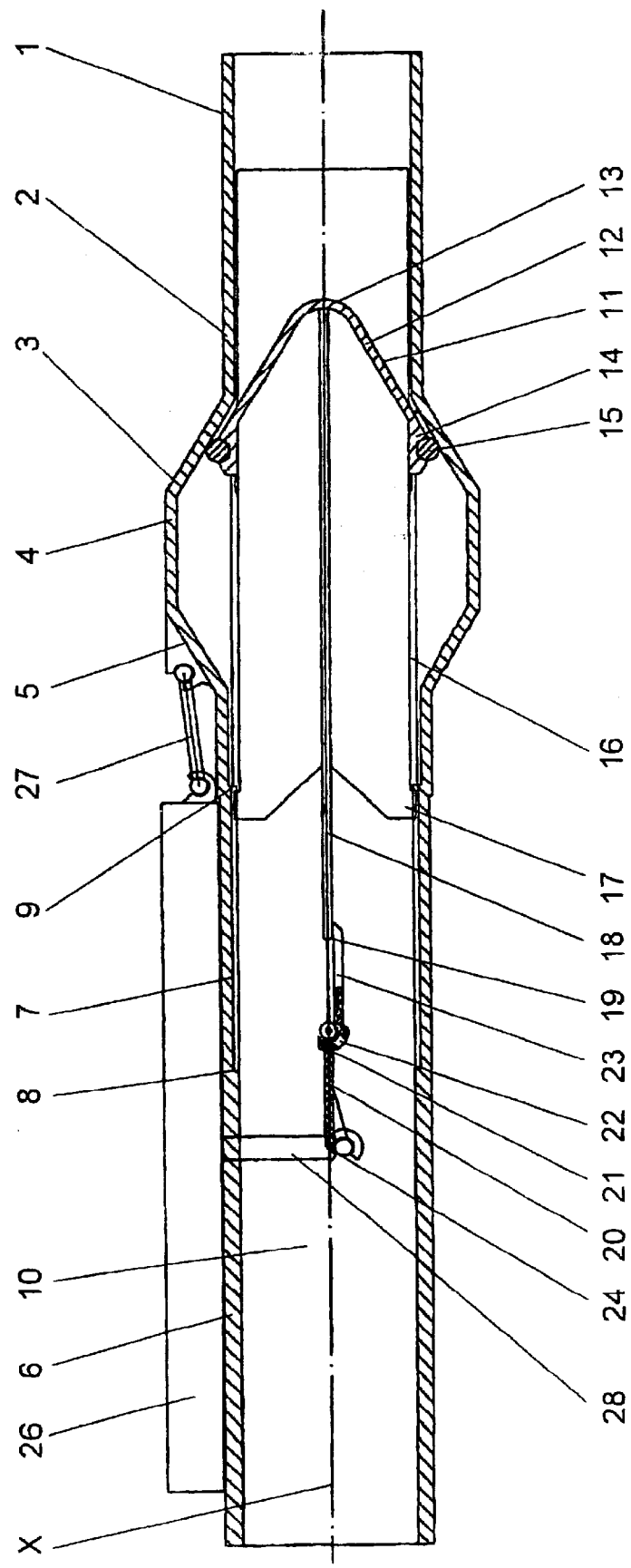
FIG. 1 shows a longitudinal section through a shut-off valve pursuant to the present invention for a fuel tank of a motor vehicle in a rest position, in which the fuel tank is sealed in relation to the surroundings.

The exemplary embodiment shows a shut-off valve for a fuel tank of a motor vehicle, said valve being arranged in a tank filler neck. FIG. 1 shows the shut-off valve in a rest position, in which the shut-off valve seals a tank (not illustrated in the figure) in relation to the surroundings, in order to avoid the escape of gaseous substances which form via the tank contents.

The shut-off valve comprises a filling tube 1 which, in the right-hand side of FIG. 1, has a filling opening via which, during a filling operation, fuel is introduced and, via a through-passage opening 10 formed in the Filling tube 1, is supplied to a further portion of the tank filler neck or to the tank. From the filling opening, a first tube portion 2 with an essentially constant cross section leads to a widened tube portion 4 with a larger inner width, this being adjoined by a second tube portion 6, having an inner width corresponds essentially to that of the first tube portion 2. The widened tube portion 4 in this case is connected to the first tube portion 2 and the second tube portion 6 respectively via wall portions 3, 5 which arc inclined in relation to the longitudinal center axis of the through-passage opening 10. In the embodiment illustrated, the tube portions 2 to 6 each have a circular inner profile, with the result that the inclined wall portions 3, 5 each form a conical valve scat for a valve body 11, which is explained in more detail hereinbelow.

The inner wall of the second tube portion 6 has an inner shoulder which directly adjoins the inclined tank-side wall portion 5 and terminates, in the direction of the tank, in a step 9 which serves as a stop for a spring support of the valve body 11. Furthermore, on the inner wall of the second tube portion 6, there are provided guide grooves 7 each with a tank-side boundary stop 8. Portions of the valve body 11 engage with sliding action in the grooves 7 in the direction of the longitudinal center axis X.

The valve body 11 is designed as a hollow cylinder with a convexity 12 which tapers in the direction of the filling opening and is rounded at a front end 13. In the embodiment illustrated, the convexity 12 is arranged concentrically with the longitudinal center axis X. The valve body 11 also comprises a radial annular portion 14 which adjoins the rear of the convexity 12 and projects into the widened region of the widened tube portion 4. The annular portion 14 bears, on its radially outer side, an elastic sealing element 15, for example an O-ring, which, depending on the position of the valve body 11, can be brought into abutment against the filling-side valve seat 3 or the tank-side valve seat 5. In the rest position, which is illustrated in FIG. 1, the sealing element 15 butts against the filling-side valve seat 3. Provided at the rear of the valve body 11 is a wing-like guide arrangement which is formed, for example, by two plates which cross in the center. The guide arrangement comprises radial guide protrusions 17 which slide in the slide grooves 7 of the filling tube 1 and thus secure the guide arrangement against rotation in the filling tube 1.

The valve body 11 is supported at the rear against the step 9 of the filling tube 1 via a spring 16. In this case, the prestressing of the spring 16 is set such that the valve body 11 is pressed with sealing action, by way of its sealing element 15, against the filling-side valve seat 3. As can be seen from FIGS. 2 and 3, the valve body 11 can be displaced in the direction of the tank, in which case the spring 16 is compressed. This displacement is necessary during filling of the tank. For this reason, the prestressing of the spring 16 is selected such that the sealing can be eliminated by the flow pressure of a medium which is to be introduced, as is provided by conventional filling arrangements.

Figure 2:
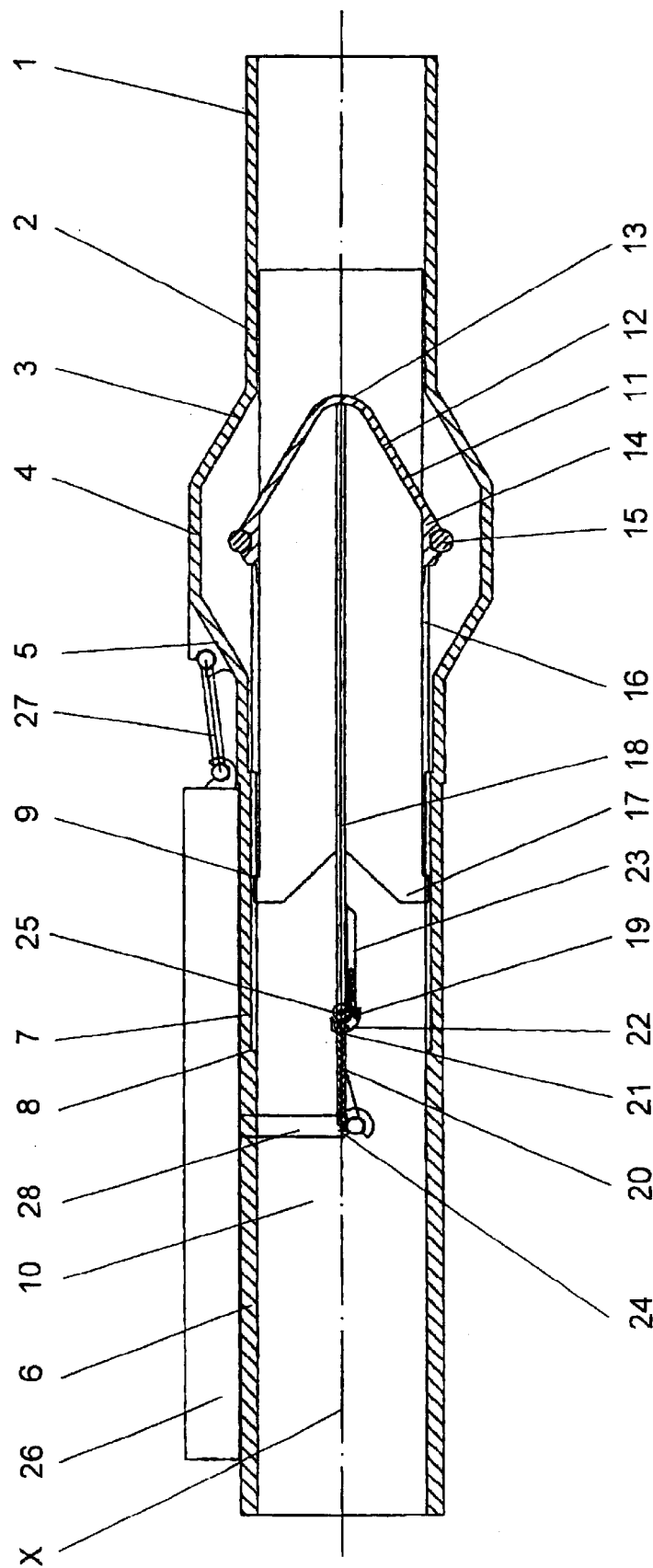
FIG. 2 shows a longitudinal section corresponding to FIG. 1 during a filling operation.

The shut-off valve also comprises a filling-level-controlled stop device 20 for stopping the movement of the valve body 11 in the direction of the tank-side valve seat 5, with the result that, during a filling operation, the sealing element 15 of the valve body 11 first of all, as is illustrated in FIG. 2, rather than passing into abutment against the tank-side valve seat 5, remains in a central position between the valve scats 3, 5. It is possible in this position for the medium which is to be introduced to flow around the valve body 11. In this case, the medium which is to be introduced presses on the end side, i.e. the convexity 12, of the valve body 11 and is thereby deflected in the direction of the widened region of the widened tube portion 4 in order, from there, to flow past the rear side of the valve body 11, through the second tube portion 6, to the tank. In this case, the stop device 20, which is arranged in the second tube portion 6, does not constitute any significant obstruction to flow since, during the filling operation, the stop device 20 has its elements extending essentially in the direction of the longitudinal center axis X.

Figure 3:
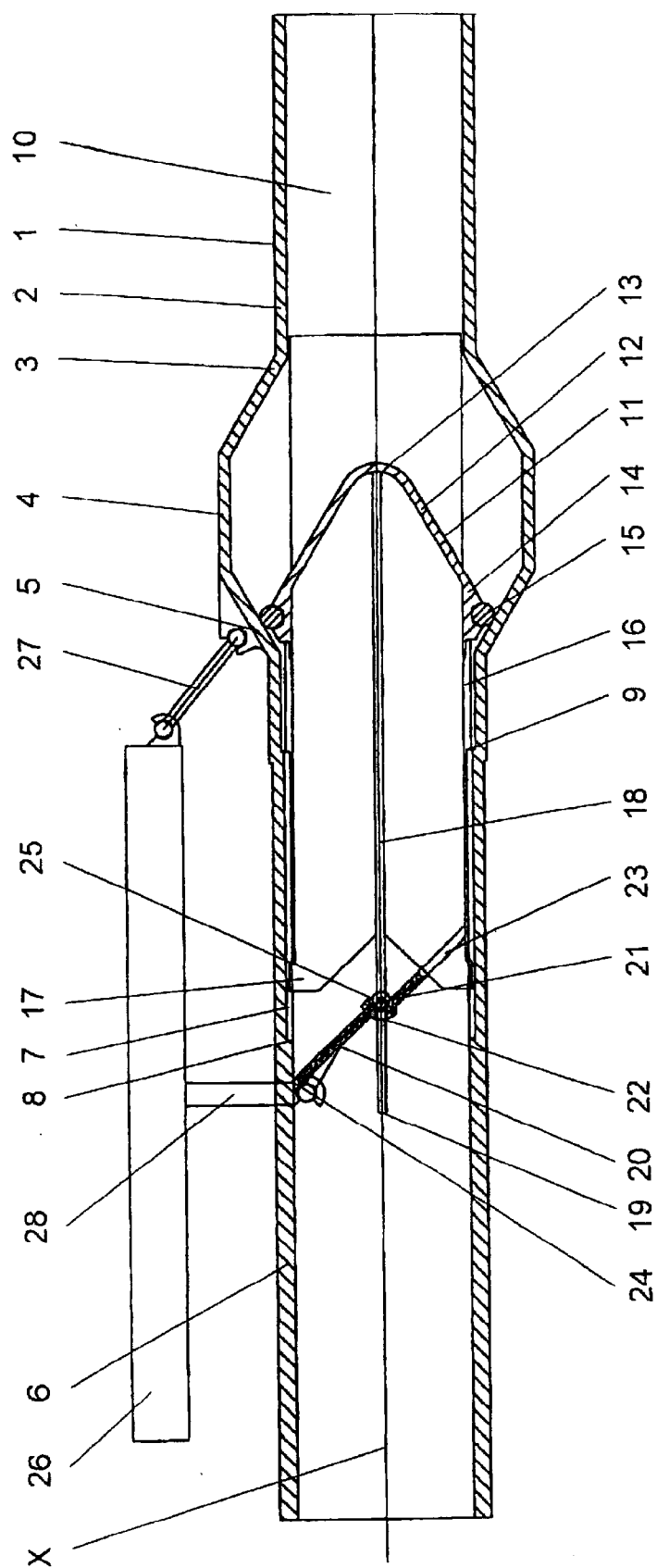
FIG. 3 shows a longitudinal section corresponding to FIG. 1 for the purpose of illustrating a filling operation being discontinued.

The filling-level-controlled stop device 20 is designed such that, when a predetermined filling level in the tank is reached, the stop action against the valve body 11 is eliminated, with the result that the latter is moved by the flow pressure from the position illustrated in FIG. 2, with the sealing element 15 arranged between the valve seats 3 and 5, into the switch-off position illustrated in FIG. 3, in which the sealing element 15 butts against the tank-side valve seat 5.

As can be seen by taking FIGS. 1 to 3 together, the stop device 20 comprises a flap which is mounted in the second tube portion 6 such that it can be pivoted about a pin 25 in the direction transverse to the longitudinal center axis X. In the embodiment illustrated, the flap is actuated by a filling-level signaling device which, in this case, is designed as a float 26, arranged in the tank, and is illustrated schematically in the figures. The float 26 is coupled to a housing portion via a double-jointed linkage 27 and is coupled to the stop device 20 via an actuating rod 28 which projects into the second tube portion 6. When a predetermined filling level in the tank is reached, the float 26 floats. The movement is transmitted, via the actuating rod 28, to the stop device 20 in order t eliminate the stop action of the stop device 20. The actuating rod 28 acts on an outer axial fastening portion 24 of the flap, with the result that a long lever arm is produced in relation to the transverse pin 25, and even just low actuating forces are sufficient for pivoting the flap; Instead of a float 26 and a mechanical actuating rod 28, it is alternatively possible for the filling level to be sensed (not illustrated in the figures), for example, by a filling-level sensor responding when a certain filling level is reached and causing an electrical actuating device to pivot the flap of the stop device 20.

The flap of the stop device 20 comprises a stop protrusion 21 which is bent around the transverse pin 25. In the filling position, which is shown in FIG. 2, the valve body 11 butts laterally against a supporting surface of the stop protrusion 21 by way of a supporting element 18 which extends at the rear and is designed, for example, in the manner of a bar or plate. As can be gathered from FIGS. 1 and 2, the flap of the stop device 20 extends essentially in the direction of the longitudinal center axis X in the rest position and during filling, with the result that the free flow diameter of the through-passage opening 10 is only restricted by the same to a small extent. It is only the stop protrusion 21 which extends perpendicularly to the throughflow direction.

Also provided on the flap is an opening 22 which is pivoted into the position of the stop protrusion 21 when the stop protrusion 21 is displaced as a result of a predetermined filling level in the tank being reached. Since the opening 22 is designed to be larger than the stop surface 19 of the supporting element 1 8, the latter, brought about by the flow pressure acting on the valve body 11, can penetrate through the opening 22, with the result that a further displacement path is released for the valve body 11. The path makes it possible for the valve body 11 to close off the second tube portion 6 in relation to the tank-side valve seat 5. The flow-opposing;, counterpressure which is built up abruptly as a result causes the filling arrangement to be switched off immediately. This state is illustrated in FIG. 3, in which the flap of the stop device 20 has been pivoted to the maximum extent.

In order, in this state, to allow the filling medium located in the second tube portion 6 to be discharged and to cause the valve body 11 to be returned into the rest position, as illustrated in FIG. 1, there is a need for pressure equalization between the front side and the rear side of the valve body 11. For this purpose, the region between the valve seats 3 and 5 is connected to the tank or the second tube portion 6 via an overflow line (not illustrated in the figures) which has a defined throttle location for slow pressure equalization. The overflow line takes effect at least upon abutment of the sealing element 15 against the tank-side valve seat 5 and may be formed, for example, by a channel which bridges the seal and is provided as a groove in the tank-side valve seat 5. Since, with a full tank, the stop device 20 remains in the position illustrated in FIG. 3, with the flap positioned obliquely, a discharge recess 23 is provided in said stop device in order to avoid the situation where medium is blocked off in the region between the flap and the tank-side valve seat 5.

With the pressure equalization on the front and rear sides of the valve body 11, the returning force of the spring 16 is sufficient in order to bring the valve body 11 into sealing abutment against the sealing-side valve seat 3 again following completion of a filling operation. As the tank empties to an increasing extent, the stop device 20 also returns into the position illustrated in FIG. 1.

The shut-off valve which is illustrated in the embodiment allows quick and precise discontinuation of a filling operation, with the result that automatic filling to the filling-level limit of the tank can take place without manual follow-up filling measures. If a filling operation is completed prematurely without the position shown in FIG. 3 being reached, then it is nevertheless ensured that, following the completion of the filling operation, the valve body 11 returns directly into the position shown in FIG. 1 in order to seal the tank in relation to the outside.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A shut-off valve for a tank, comprising: a filling tube with a filling-side valve seat and a tank-side valve seat, said seats being spaced apart from one another in a throughflow direction of the filling tube; a valve body with a sealing element movable between the valve seats so as to butt against one of the valve seats depending on position of the valve body in the tube; means for prestressing the valve body toward the filling-side valve seat so as to seal the filling tube in relation to the filling-side valve seat in a rest position of the valve body, the prestressing means being configured so that the prestressing of the valve body can be overcome by flow pressure of a medium which is to be introduced toward the tank-side valve seat; and a filling-level-controlled stop device operatively arranged so as to be movable between a first position for stopping movement of the valve body in the direction of the tank-side valve seat in a position in which the valve body abuts the stop device so that the sealing element is kept at a distance from the valve seats and so that the medium which is to be introduced can flow around the valve body, and a second position in which the stop action of the stop device is eliminated when a predetermined filling level in the tank is reached so that the valve body moves to a position in which the valve body contacts the tank side valve seat to shut off fuel flow to the tank, the filing tube including a first tube portion via which, during a filling operation, the medium is introduced, a second tube portion arranged downstream of said valve body and having an inner width corresponding substantially to that of the first tube portion, and a widened tube portion with a larger inner width than the first and second tube portions, arranged between the first tube portion and the second tube portion, the valve body being arranged in the widened tube portion.

2. A shut-off valve as defined in claim 1, wherein the valve seats are wall portions which are inclined in relation to the throughflow direction.

3. A shut-off valve as defined in claim 1, wherein the sealing element has an outer width that is smaller than an inner width of the widened tube portion but greater than the inner width of the throughflow opening of the filling tube.

4. A shut-off valve as defined in claim 1, wherein the valve body is a hollow piston.

5. A shut-off valve as defined in claim 1, wherein the valve body has an end side oriented toward the filling-side valve seat which is designed as a convexity that tapers toward the filling-side valve seat.

6. A shut-off valve as defined in claim 1, wherein the valve body is guided with sliding action on an inner-wall portion of the filling tube. action, by way of the sealing element, against the filling-side valve seat, the sealing being eliminatable by the flow pressure of the medium which is to be introduced.

7. A shut-off valve as defined in claim 1, wherein the prestressing means includes a spring arranged so as to support the valve body against the inner wall of the filling tube, the spring having a prestress so that the valve body is automatically pressed with sealing action, by way of the sealing element, against the filling-side valve seat, the sealing being eliminatable by the flow pressure of the medium which is to be introduced.

8. A shut-off valve as defined in claim 1, and further comprising an overflow line arranged so as to connect a region between the valve seats to a portion of at least one of the filling tube and the tank downstream of the tank-side valve seat when the sealing element butts against the tank-side valve seat and has a defined throttle location for slow pressure equalization.

9. A shut-off valve as defined in claim 1, wherein the valve body has a supporting element and the stop device has a displaceable stop protrusion for stopping movement of the valve body, the stop protrusion being arranged in a tube portion of the filling tube between the tank-side valve seat and the tank so that, during a filling operation, the supporting element of the valve body butts against the stop protrusion in a stopped position so as to prevent the valve body from contacting the tank-side valve seat, and further comprising a filling-level signaling device operatively connected to the stop device so that at a predetermined filling level in the tank the stop protrusion is moved out of the stopped position so as to release a further displacement path for the supporting element of the valve body thereby allowing the valve body to contact the tank-side valve seat.

10. A shut-off valve as defined in claim 9, wherein the stop device comprises a flap which is pivotable about a pin in a direction transverse to the throughflow direction, said flap having said displaceable stop protrusion and an opening, the opening being pivotable into a position of the stop protrusion upon displacement of the stop protrusion as a result of a predetermined filling level in the tank being reached so as to permit the supporting element of the valve body to pass through the opening.

11. A shut-off valve as defined in claim 10, wherein the flap is a plate-like element with a border portion which is bent about the transverse pin as the stop protrusion, against a supporting surface of which the supporting element of the valve body can be brought into lateral abutment, the opening on the plate-like element being arranged so as to adjoin the stop protrusion in order to pass into the position of the supporting surface when the plate-like element is pivoted about the transverse pin, the opening being larger than the supporting surface so as to allow the supporting element of the valve body to pass therethrough.

12. A shut-off valve for a tank, comprising: a filling tube with a filling-side valve seat and a tank-side valve seat, said seats being spaced apart from one another in a throughflow direction of the filling tube; a valve body with a sealing element movable between the valve seats so as to butt against one of the valve seats depending on position of the valve body in the tube; means for prestressing the valve body toward the filling-side valve seat so as to seal the filling tube in relation to the filling-side valve seat in a first, rest position of the valve body, the prestressing means being configured so that the prestressing of the valve body can be overcome by flow pressure of a medium which is to be introduced toward the tank-side valve seat; a filling-level-controlled stop device operatively connected to the valve body for stopping movement of the valve body in the direction of the tank-side valve seat in a position in which the valve body abuts the stop device so that the sealing element is kept at a distance from the valve seats and so that the medium which is to be introduced can flow around the valve body; and a filling level signaling device operatively connected to the stop device so that the stop action of the stop device is eliminated when a predetermined filling level in the tank is reached thereby allowing the valve body to move into a second position in which the valve body contacts the tank-side valve seat, the filing tube including a first tube portion via which, during a filling operation, the medium is introduced a second tube portion arranged downstream of said valve body and having an inner width corresponding substantially to that of the first tube portion, and a widened tube portion, with a larger inner width than the first and second tube portions, arranged between the first tube portion and the second tube portion, the valve body being arranged in the widened tube portion, the widened tube portion being connected to the first tube portion and the second tube portion via tube wall portions, respectively, which are inclined in relation to the throughflow direction and form said valve seats, the valve body having an end side oriented toward the filling-side valve seat which is formed as a convexity that tapers toward the filling-side valve seat.

* * * * *